United States Patent [19]

Francis et al.

[11] 4,400,798
[45] Aug. 23, 1983

[54] MEMORY PATCHING SYSTEM

[75] Inventors: Robert S. Francis, Beaverton; Bruce C. Stofer, Hillsboro, both of Oreg.

[73] Assignee: Tektronix, Inc., Beaverton, Oreg.

[21] Appl. No.: 282,367

[22] Filed: Jul. 13, 1981

[51] Int. Cl.³ .............................................. G11C 11/34
[52] U.S. Cl. .................................................. 365/174
[58] Field of Search ................. 365/174, 94, 189, 230, 365/244

Primary Examiner—George G. Stellar
Attorney, Agent, or Firm—George T. Noe

[57] ABSTRACT

A memory patching system which transfers permanent-type information in a read-only memory (ROM) to a random access memory (RAM) and modifying contents of the RAM in accordance with patch information in an eraseable programmable ROM is disclosed.

9 Claims, 1 Drawing Figure

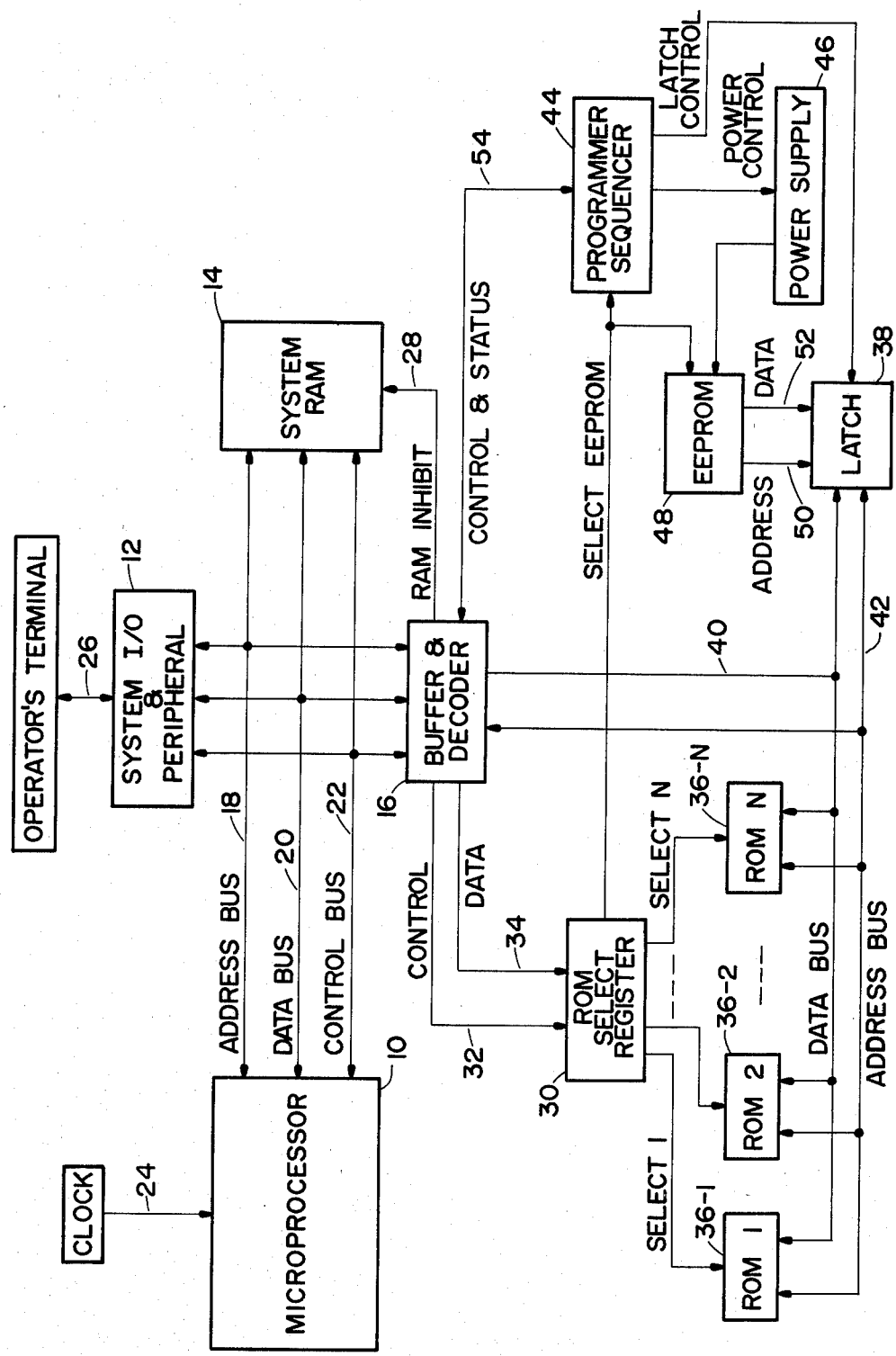

MEMORY PATCHING SYSTEM

BACKGROUND OF THE INVENTION

The present invention relates to a memory patching system for altering information contained in Read Only Memories (ROM's) used in electrical computers and processors.

Unalterable ROM's are used in computers, processors and other such applications requiring the storage of permanent type information. The ROM's are efficient unalterable information storage devices, however, there is a problem when it becomes necessary to change the stored information because of, for example, information code deficiencies or updating. This problem could be solved by replacing a particular ROM with a new ROM programmed with the correct or updated information. However, this solution is neither feasible nor economical.

U.S. Pat. Nos. 3,588,830 and 3,755,791 disclose error correcting schemes for memory systems, and their purposes are to correct bad data bits to improve reliability, not alter the information, namely, the machine code data. U.S. Pat. No. 4,032,765 discloses a method of correcting ROM output by altering individual bits of the output by controlling AND/OR gates on the output, and a "patch package" is used to provide the data for changes. This technique is targeted for ROM fabrication but only provides a single ROM address correction only. U.S. Pat. No. 4,047,163 discloses a technique for implementation of fault tolerant cells within addressable arrays for semiconductor memories, but it is only for reliability and yield increase of memory IC's. U.S. Pat. No. 4,051,460 is another technique for error correction within semiconductor memory chips, but it does not apply to alteration of machine code data. U.S. Pat. No. 4,070,651 discloses a technique utilizing a PROM and counter scheme for correcting errors in magnetic bubble memory systems whereby another loop output is substituted for a defective one as necessary. U.S. Pat. No. 3,331,058 is a technique for correcting permanent errors in thin film magnetic memories. It is targeted at reliability and yield increase of devices but not data alteration after installation. U.S. Pat. No. 4,028,678 discloses a technique based on hardware that provides interception of a processor address and substitution of data as required. Its purpose is to correct bad ROM program data, but it is very limited in the number of locations correctable (8 maximum). In addition, only a single location may be altered at one time. U.S. Pat. No. 4,028,679 represents an expansion of the above U.S. Pat. No. 4,028,678, and the number of patches is increased through the addition of address bits to an auxiliary memory. Even though the number of patches is increased, it is limited. U.S. Pat. No. 4,028,683 is a refinement of the above U.S. Pat. No. 4,028,679 whereby a counter is added to provide even more bits of address to the auxiliary memory, however, the number of patches is not enough. U.S. Pat. No. 4,028,684 discloses a memory patching circuit that has ability to correct mistakes of data already present.

SUMMARY OF THE INVENTION

The present invention consists of a hardware architecture and software program based procedure which utilizes an Eraseable Programmable Read Only Memory (EPROM) to provide a mechanism for patching machine code contained in a ROM. Information for a ROM address to be patched and new machine code is stored in the EPROM. For controlling any system in accordance with the machine code stored in the ROM and EPROM, the machine code stored in the ROM is transferred to a Random Access Memory (RAM) and a desired portion of the transferred code appointed with the address information is altered with the machine code stored in EPROM under control of a processor. This patching process is based on firmware stored in the ROM. After the patching process is completed, the system is controlled in accordance with the machine code stored in the RAM. Even if the capacity of the new machine code is larger than that of the old machine code, there is no problem because the RAM has enough memory capacity for patching.

It is therefore one object of the present invention to provide a novel memory patching system which requires no physical alteration of devices when information stored in a ROM is changed.

It is another object to provide a memory patching system which accommodates larger and unrestricted patches.

It is a further object to provide a memory patching system which can change contents of patches at any time.

The present invention is pointed out with particularity in the appended claims. Other objects and advantages will become apparent to those having ordinary skill in the art upon a reading of the following description when taken in conjunction with the accompanying drawing.

DRAWING

A single FIGURE shows a block diagram of a preferred embodiment according to the present invention.

DETAILED DESCRIPTION OF THE INVENTION

Turning now to the drawing, microprocessor 10, system Input/Output (I/O) and peripheral 12, system RAM 14, and buffer and decoder 16 are connected to each other via address bus 18, data bus 20 and control bus 22. Microprocessor 10 receives a clock pulse via line 24, and system I/O and peripheral 12 is connected to an operator's terminal or a system under control via bidirectional bus 26. Buffer and decoder 16 inhibits system RAM 14 via line 28, and controls ROM select register 30 via control line 32 and data line 34. Register 30 selects one of a plurality of ROM's 36, wherein the number of ROM's 36 may be, for example, thirty. These ROM's 36 store machine codes as firmware for controlling system I/O and peripheral 12, the operator's terminal or the system under control connected to block 12, and one of ROM's 36 stores firmware for patching. Buffer and decoder 16, ROM 36 and latch circuit 38 are connected to each other via data bus 40 and address bus 42. Latch circuit 38 is controlled in response to a latch control signal from programmer sequencer 44 which supplies a power control signal to power supply 46. EPROM 48 such as an Electrically EPROM (EEPROM) receives a variable power voltage from power supply 46 for controlling write and read out modes. Latch circuit 38 is connected to EEPROM 48 via address line 50 and data line 52. ROM select register 30 supplies a select signal to programmer sequencer 44 and EEPROM 48. Control and status line 54 is connected between buffer and decoder 16 and programmer sequencer 44.

For executing a command from the terminal connected to system I/O 12, the command from system I/O 12 is applied through address bus 18, data bus 20 and control bus 22 to the buffer portion of block 16, and is decoded by the decoder portion of block 16 for producing the control and data signals on lines 32 and 34. ROM select register 30 stores the data signal on line 34 in response to the control signal on line 32 so that only one of the output lines therefrom enables ROM 36. Microprocessor 10 generates the address signal which changes sequentially and is applied to ROM's 36 through address bus 18, the buffer portion of block 16 and address bus 42. Block 16 does not inhibit system RAM 14. The firmware (machine code) stored in the appointed ROM is read in response to the address signal, and is applied to system RAM 14 via data bus 40, the buffer portion of block 16 and data bus 20. In other words, the appointed firmware is transferred to RAM 14. Microprocessor 10 executes the command in accordance with the firmware in RAM 14.

When it becomes necessary to change the machine code in ROM 36 because of deficiencies or updating, the following patching function is available. A patch input mode is selected with a keyboard connected to system I/O 12, and buffer and decoder 16 detects the patch input mode to inhibit system RAM 14 and tell programmer sequencer 44 the patch input mode. Moreover, block 16 applies the control and data signals to ROM select register 30 which applies the select signal to programmer sequencer 44 and EEPROM 48. Programmer sequencer 44 controls power supply 46 so as to apply a voltage for writing to EEPROM 48. New machine codes and address information (describing which ROM address is affected) as a data signal and EEPROM address information as an address signal are applied from the keyboard through system I/O 12, buses 18–20, the buffer portion of block 16, buses 40–42, latch circuit 38 and lines 50–52 to EEPROM 48. Latch circuit 38 latches these data and address signals under control of programmer sequencer 44 to ensure that EEPROM 48 stores the data signal at the appointed address.

For executing the command under control of the patched firmware, the corresponding firmware stored in ROM 36 is transferred to system RAM 14 as described hereinbefore. After the transfer, microprocessor 10 selects EEPROM 48 via buffer and decoder 16 and ROM select register 30. Moreover, block 16 tells programmer sequencer 44 the readout mode, and programmer sequencer 44 controls power supply 46 so as to apply a voltage for the readout to EEPROM 48. Microprocessor 10 applies the address signal to EEPROM 48 through bus 18, the buffer portion of block 16, bus 42, latch circuit 38 and address line 50 for reading the data stored in EEPROM 48. The output data from EEPROM 48 is transferred to microprocessor through data line 52, latch circuit 38, bus 40, the buffer portion of block 16 and bus 20 for determining which RAM locations correspond to affected ROM locations. It should be noted that latch circuit 38 operates as only signal paths and does not operate as the latch in this mode. The appointed machine codes in system RAM 14 are altered with the new codes stored in EEPROM 48, wherein the new codes are transferred from EEPROM 48 to system RAM 14 via line 52, latch circuit 38, bus 40, the buffer portion of block 16 and bus 20. This patch operation is controlled in accordance with the firmware stored in ROM 36. After the patch is completed, microprocessor 10 executes the command in accordance with the modified (patched) machine code (firmware) in RAM 14. Even if the capacity of new machine codes is larger than that of the former codes, there is no problem because RAM 14 has sufficient extra memory space. Of course, additional firmware can be added to the former firmware in ROM 36 by use of EEPROM 48.

As understood from the above description, the patches may be removed or changed without physically altering the devices. Changing information may be distributed to customers on paper and may then be installed by themselves. Many portions of the firmware in ROM 36 may be patched.

While we have shown and described herein the preferred embodiment of our invention, it will be apparent to those skilled in the art that many changes and modifications may be made without departing from our invention in its broader aspects. For example, the EPROM may be a bubble memory or the like instead of the EEPROM. However, the EEPROM is proper because it is compact and inexpensive. Moreover, a direct memory access system may be added to microprocessor 10 for improving processing speed.

We claim as our invention:

1. A memory patching system, comprising;
   a first memory containing permanent type information;
   a second memory containing patch information;
   a third memory; and
   control means for transferring contents of said first memory to said third memory, and modifying contents of said third memory in accordance with contents of said second memory.

2. A memory patching system according to claim 1, wherein said first memory is a read only memory.

3. A memory patching system according to claim 1, wherein said second memory is an eraseable programmable read only memory.

4. A memory patching system according to claim 3, wherein said eraseable programmable read only memory is an electrically eraseable programmable read only memory.

5. A memory patching system according to claim 1, wherein said third memory is a random access memory.

6. A memory patching system according to claim 1, wherein said control means includes a microprocessor.

7. A memory patching system according to claim 1, wherein said control means controls to store said patch information in said second memory.

8. A memory patching system, comprising;
   an unalterable read-only memory storing permanent type information;
   an eraseable programmable read-only memory;
   a random access memory; and
   control means for storing patch information in said eraseable programmable read only memory, transferring said permanent-type information stored in said unalterable read only memory to said random access memory, and
   modifying said transferred information in said random access memory in accordance with said patch information in said eraseable programmable read-only memory.

9. A memory patching system according to claim 8, wherein said patch information includes data information and address information corresponding to the permanent type information to be modified.

* * * * *